Patented Aug. 10, 1943

2,326,539

UNITED STATES PATENT OFFICE 2,326,539

POWDERED RESIN MANUFACTURE

Ernest Paul Irany, Shawinigan Falls, Quebec, Canada, assignor to Shawinigan Chemicals Limited, Montreal, Quebec, Canada, a corporation of Canada No Drawing. Application April 29, 1940, Serial No. 332,378. In Canada March 23, 1940

11 Claims. (Cl. 260—73)

INTRODUCTION

This invention relates to the manufacture of powders from thermoplastic resinous materials, particularly those containing a plurality of aliphatic hydroxyl groups per molecule.

A principal object of the invention is to provide a very finely divided, free-flowing thermoplastic resin powder of high density. A further object is to provide a simple and economical method of producing such powder.

METHODS OF COMMINUTION

The inherent characteristics of most thermoplastic resinous materials has made it impossible to powder them by ordinary methods, so as to obtain a powder of sufficient density and free-flowing capacity for certain uses. For instance, many high-polymer resins of the greatest commercial utility, including those of the vinyl ester-acetal type and the various cellulose derivatives, possess toughness and impact resistance to such a degree that it is impossible, by mechanical crushing or grinding, to transform them into anything beyond a very coarse powder.

The thermoplasticity of these resins also renders entirely unsuitable the use of attrition grinders using the friction principle; even if the temperature can be controlled, the heat generated in the material, combined with pressure, tends to reagglomerate the particles. Impact crushers cease to be effective at the point where the particle becomes too light to carry its own shattering energy, at the maximum speed at which machines of this type may be run with safety. The finest powders obtained in this way are about 40 mesh. These difficulties have, up until now, prevented the production of tough thermoplastics, in the form of fine powder, even without regard to cost.

The spraying of solutions or emulsions of these resins either into a stream of air or into a large volume of a liquid precipitating agent, produces voluminous and fluffy particles, which are useful where extensive surface development is desirable, but not where a finely divided free-flowing powder of high density is essential.

Another method of comminution consists of filling the resin with a very large quantity, usually about 300%, of a powdered non-plastic and chemically inactive filler which is soluble in water or some other non-solvent for the resin, for example, rock salt. The mixture, which may be produced on heated mixing rolls, is brittle and can be ground in a ball mill, to a fine powder which may then be leached and dried. However, this method is inconvenient to use due to the hygroscopicity of the salt; it is expensive and the yields are limited because the resin, even though highly filled, remains thermoplastic; the removal of a large volume of salt leaves the particle porous, badly flowing, and with a tendency to agglomerate.

PRESENT INVENTION

In contrast to these developments, the present invention is based on the very surprising discovery that certain resins, otherwise non-powderable can, by chemical reaction with a suitable agent, be formed into a derivative which is powderable. A specific embodiment of this discovery is in the case of resins containing a plurality of aliphatic OH groups per molecule. These resins, when reacted with relatively small amounts of boric acid which may be dispersed with a suitable solvent, form a brittle substance which can be pulverized easily.

THE REACTION

To elaborate, it has been found that the boric acid has the capacity of forming esters or ester-like complexes with compounds containing two or more alcoholic hydroxyl groups per molecule. If these compounds are macro-molecular the boric acid reacts with them, under formation, it is believed, of poly-functionally bridged resins, which are insoluble and infusible. However, they can be regenerated in their original form by mere contact with water whereby the ester-like bridges are thought to be hydrolyzed.

CHARACTERISTICS OF TREATED RESIN

Surprisingly, the borated resins are entirely non-plastic for the purposes of this application i. e. under conditions of crushing or grinding by known methods after evaporation of any solvents, which may have been used in the treatment. In this state, they can, without regard to frictional heat, which does not interfere with their brittleness, be ground to any mesh size and by any type of mill. They may then be recovered in their original thermoplastic state by removing the boric acid for instance simply by washing with water or certain aqueous solutions.

RESINS TREATED

This method, using boric acid, is applicable to any thermoplastic or resinous compound, regardless of its molecular complexity or physical properties, provided that it contains an appreciable number of aliphatic hydroxyl groups (per molecule or per physical entity). These compounds include, for example, partially hydrolyzed polyvinyl esters, polyvinyl acetal resins of all kinds, except those completely re-esterified, cellulose esters and ethers; also co-polymers of vinyl acetate (containing OH groups) and other compounds such as vinyl chloride, also physical mixtures of different resins at least one of which is capable of forming, in the sense of this invention, an infusible and brittle boric acid complex. The treatment is also applicable in the presence of plasticizers and other modifying agents. The fine powders obtained are unique and novel. In the case of those mentioned, from resilient thermoplastic resins, they are distinguished by the density, non-porosity and compact shape of the particles.

Following the principle of this invention, namely that of embrittling resins by chemical reaction prior to comminution, the treatment of various types of resins may be accomplished. It is only necessary that the resin be reacted with an agent capable of forming with it a compound having a reversible spatially-latticed structure, which may subsequently be destroyed by means not affecting the resin as such.

The apparent density of the powder is about the same as that of the resin in such granular forms of coarser particle size which may be obtainable through mechanical comminution by means already known and practised.

In order to illustrate the nature of the invention more fully, the following examples are given. It will, however, be understood that the procedure set out may be varied considerably within the scope of the invention, so that these examples are not meant to be interpreted in a limiting sense.

*Example 1*

The starting material was a resin made from a polyvinyl acetate (viscosity of 8.6% benzene solution at 20° C., 15 centipoises) by hydrolysis and simultaneous reaction with formaldehyde, and composed of 7½% by weight polyvinyl acetate, 5½% by weight polyvinyl alcohol, the remainder being polyvinyl formal. The polyvinyl formal so formed was mixed cold with solvents comprising, 1½ parts by weight of a mixture of 3 volumes benzene and 1 volume alcohol until a homogeneous semi-fluid mass was obtained. To this was added powdered boric acid, 5% by weight of the resin, and worked uniformly into the mixture. The solvents were removed, and the dry material kept under reduced pressure at 90–100° C. for several hours so as to accelerate the removal of remaining solvents. The material was then broken up and ground in a ball mill until it passed completely through a 200 mesh screen. To remove the boric acid from the compound the fine powder was suspended in a large volume of water at 70° C. and stirred; after replacing the water once or twice, the material was separated on a suction filter and dried at 70° C. Chemical analysis and the physical properties of the product were substantially the same as those of the starting material. The apparent density of the final product was about 0.48 gm. per c. c.

*Example 2*

The starting material was a resin made from a polyvinyl acetate (viscosity of 8.6% benzene solution at 20° C., 15 cp.) by hydrolysis and simultaneous reaction with acetaldehyde, and composed of 10.0% by weight polyvinyl acetate, 8.7% by weight polyvinyl alcohol, the remainder being polyvinyl acetal. The polyvinyl acetal so formed was mixed cold with 1½ parts by weight of ethyl acetate as a solvent until a semifluid, homogeneous mass was obtained. To this mass was added powdered boric acid, 5% by weight of the resin, which was worked uniformly into the mixture, the latter being treated exactly as in Example 1, with the same results. The apparent density of the powder after removal of the boric acid was about .45 gm. per c. c.

*Example 3*

A resin made from a polyvinyl acetate (viscosity of 8.6% benzene solution at 20° C., 25 centipoises) by hydrolysis in alcoholic solution containing alkali, and subsequent reaction with butyraldehyde, and composed of 2% by weight polyvinyl acetate, 18% by weight polyvinyl alcohol, the remainder being polyvinyl butyral, was mixed cold with 1¾ parts by weight of dioxane containing about 10% water until a semi-fluid, homogeneous mass was obtained. To this was added powdered boric acid, 10% by weight of the resin, and worked uniformly into the mixture. After drying and grinding, as in Example 1, the resulting fine powder was leached with continuously replaced water at room temperature until the resin was free from boric acid; it was then dried at a temperature not exceeding 40° C. The powder resulting had an apparent density of about 0.51 gm. per c. c.

*Example 4*

A resin was made from a polyvinyl acetate (viscosity of 8.6% benzene solution at 20° C., 15 centipoises) by substantially complete hydrolysis or alcoholysis, was dissolved in about 1½ parts by weight of water and 5% by weight of boric acid was mixed into the solution. The resulting viscous material was dried under reduced pressure and ground to a fine powder. The boric acid was removed therefrom by leaching with aqueous acetone (80 vol. %), displacing the latter by pure acetone and drying in dry air. The powder thus obtained had an apparent density of approximately .55 gm. per c. c.

*Example 5*

A plasticized cellulose acetate marketed under the trade name "Tenite Mh" is mixed with an appropriate amount of acetone to produce a highly viscous solution. To this, 10% boric acid was added. The mixture was then treated as described in Example 1, with the result that a cellulose acetate powder having an apparent density of about 0.63 gm. per c. c. was obtained.

*Example 6*

Ethyl cellulose (Hercules Powder Co. Inc., high viscosity grade) was mixed with enough methanol to produce a viscous syrup. 5% boric acid was added and the homogeneous mixture was freed from methanol by drying. The resulting material was ground to a fine powder after which it was washed with water until free from boric acid and dried, when it had an apparent density of about 0.54 gm. per c. c.

*Example 7*

A plasticized cellulose acetate compound of the composition:

| | Parts by weight |
|---|---|
| Cellulose, acetylated to 52.75% in terms of acetic acid | 100 |
| "Santicizer" M-17 (methyl phthally ethyl glycollate) | 33 |
| "Santicizer" E-17 (ethyl phthally ethyl glycollate) | 1 |
| Triphenyl phosphate | 16 |
| Camphor | 6 |
| Spermaceti wax | 0.5 | was reduced to semi-fluidity by mixing with acetone. After addition and distribution of 5% by weight of the resin of powdered boric acid, the solvent was evaporated. The mass was ground to 100 mesh in a ball mill, leached twice with water at 70° C., and dried. The apparent density of the powder was about 0.47 gm. per c. c.

*Example 8*

100 parts by weight of polyvinyl acetate (viscosity 15 centipoises in 8.6% benzene solution at 20° C.) were mixed with about 200 parts by weight of anhydrous methanol. When the mixture had become homogeneous, 0.20 part by weight of sodium hydroxide dissolved in methanol were added and the mixture was left standing for one hour at room temperature. Five parts by weight of boric acid were then dissolved in the mixture; after evaporation, the dry material could be ground to an impalpable powder and washed with cold water until free of boric acid. The apparent density of the washed powder was about 0.56 gm. per c. c.

The advantages obtainable by practice of the present invention are considerable. A most important feature is that a powder is obtained finer than the other granular forms available from the particular resinous material by known methods of mechanical grinding or crushing, and which is composed of particles of maximum density, non-porosity and compactness of shape. This type of powder is particularly useful where a coarser granulated material will not suffice, as for instance, in spraying with the Schori gun. The manner of obtaining this product is economical and thoroughly practical.

It will be understood that various modifications may be made in this invention without departing from the spirit thereof or the scope of the claims, it being desired that only such limitations shall be placed thereon as may be imposed by the state of the prior art or are set forth in the accompanying claims.

The sub-titles used throughout the specification are merely to simplify reference thereto and should otherwise be disregarded.

I claim:

1. A method of producing a powdered thermoplastic comprising mixing boric acid with a thermoplastic material containing a plurality of aliphatic hydroxyl groups per molecule, reacting the boric acid with the material in the absence of a hydroxyl compound to produce a non-plastic brittle reaction product of the thermoplastic material with boric acid, said reaction product being capable of being ground to a powder having a fineness considerably greater than 40 mesh, powdering the chemical reaction product and treating the powdered chemical reaction product to recover the starting material as a fine dense powder substantially free from boric acid.

2. A method in accordance with claim 1 in which the powdered chemical reaction product is treated with a solvent for the boric acid which is a non-solvent for the material to recover the starting material.

3. A method in accordance with claim 1 wherein the boric acid is added to a solution of the material, the solvent removed, and the reaction product is ground and treated to recover the starting material.

4. A method of producing a powdered plastic of a type containing a plurality of aliphatic hydroxyl groups per molecule, comprising, reacting polyvinyl acetal resin having a plurality of aliphatic hydroxyl groups per molecule with boric acid, powdering the reaction product and recovering the plastic from the reaction product in the powdered form.

5. A method of producing a powdered plastic of a type containing a plurality of aliphatic hydroxyl groups per molecule, comprising, reacting with boric acid polyvinyl acetate resin which is at least partially hydroxyzed, powdering the reaction product, and recovering the plastic from the reaction product in the powdered form.

6. A method of producing a powdered plastic of a type containing a plurality of aliphatic hydroxyl groups per molecule, comprising, reacting a cellulose derivative containing a plurality of aliphatic hydroxyl groups per molecule with boric acid, powdering the reaction product and recovering the plastic from the reaction product in the powdered form.

7. A method of producing a powdered plastic of a type containing a plurality of aliphatic hydroxyl groups per molecule, comprising, reacting with boric acid a polyvinyl resinous compound containing a plurality of aliphatic hydroxyl groups per molecule, powdering the reaction product, and recovering the plastic from the reaction product in the powdered form.

8. A resinous non-plastic brittle chemical reaction product produced by mixing boric acid with a thermoplastic material containing a plurality of aliphatic hydroxyl groups per molecule, reacting the mixture in the absence of a hydroxyl compound to produce a non-plastic brittle reaction product of the thermoplastic material with boric acid, said reaction product being capable of being ground to a fineness considerably greater than 40 mesh.

9. A product according to claim 8 in which the thermoplastic material is a polyvinyl acetal resin.

10. A product according to claim 8 in which the thermoplastic material is a polyvinyl acetate resin which is at least partially hydrolyzed.

11. A product according to claim 8 in which the thermoplastic material is a cellulose derivative.

ERNEST PAUL IRANY.